Oct. 26, 1937.  L. F. CLERC  2,096,959
STORE
Filed Dec. 26, 1935  5 Sheets-Sheet 1

INVENTOR.
LEONARD F. CLERC
BY Edward M. Apple
ATTORNEY.

Oct. 26, 1937.    L. F. CLERC    2,096,959
STORE
Filed Dec. 26, 1935    5 Sheets-Sheet 3

INVENTOR.
LEONARD F. CLERC
BY Edward M. Apple
ATTORNEY.

Oct. 26, 1937.  L. F. CLERC  2,096,959
STORE
Filed Dec. 26, 1935   5 Sheets-Sheet 4
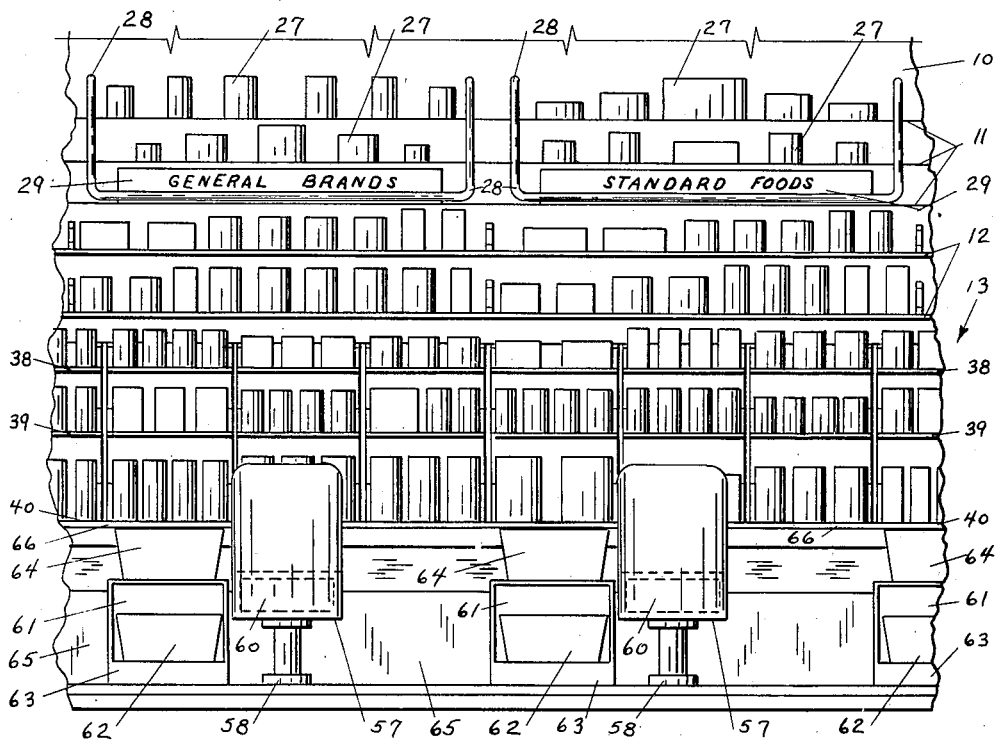
Fig. 5
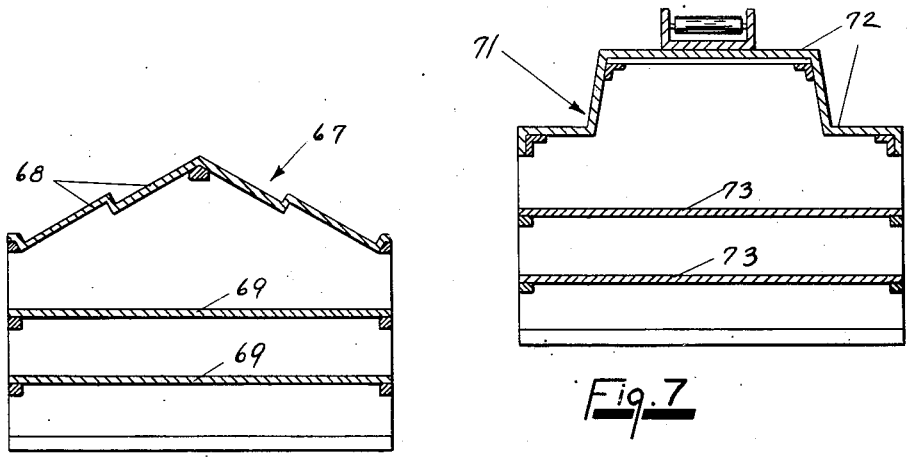
Fig. 6
Fig. 7
INVENTOR.
LEONARD F. CLERC
BY Edward M. Apple
ATTORNEY.

Oct. 26, 1937.   L. F. CLERC   2,096,959
STORE
Filed Dec. 26, 1935    5 Sheets-Sheet 5

INVENTOR.
LEONARD F. CLERC
BY  *Edward M. Apple*
ATTORNEY.

Patented Oct. 26, 1937

2,096,959

UNITED STATES PATENT OFFICE 2,096,959

STORE

Leonard F. Clerc, Detroit, Mich.

Application December 26, 1935, Serial No. 56,131

3 Claims. (Cl. 186—1)

This invention relates to a store system and has particular reference to means and methods of retailing merchandise to customers in a store.

Heretofore, the common practice in grocery stores, meat markets, fruit and vegetable markets, and the like, has been to stock the merchandise on shelves and to sell it to the customers in an "over the counter" service. This service necessitated a number of clerks who waited on individual shoppers, took their orders, selected the ordered goods from the shelves, put the merchandise in bags, and charged the customer for the merchandise bought. The inefficiencies of this age-old system are readily apparent, and include unnecessary clerical cost, slow service and prolonged waiting by customers when the store is busy, loss of many possible sales by lack of efficient display of the merchandise stocked, and numerous other disadvantages.

More recently an improved type of store has been introduced, in which the customer serves himself. The merchandise is displayed on shelves and the customer selects the products he wishes and presents them to the cashier, who totals the prices and charges the customer for them in a manner similar to the well-known cafeteria or serve-self restaurant. Although this system has some notable features, it has many disadvantages, including the objectional effort necessary for the customer to locate the merchandise desired.

The present invention obviates the disadvantageous features of the former methods and has for its principal object the provision of a means for efficiently selling merchandise, produce, groceries, eats and other commodities to individual customers in a store.

Another object of the invention is the provision of means whereby the entire selection of merchandise in the store is moved past each customer, who may be comfortably seated in a chair.

Another object of the invention is the provision of means whereby the customers may select merchandise from stationary shelves or racks, if desired.

A further object of the invention is the provision of means for restocking the moving conveyors or shelves, without interfering with their operation.

A still further object of the invention is the provision of means for bundling individual orders, checking them if desired, delivering them to the customers, and receiving the payment thereof.

An advantageous feature of the invention resides in the ease, comfort, and speed with which the customers may shop.

Another advantageous feature of the invention resides in the increased number of customers which may be handled in smaller stores and with smaller clerical forces than in any present known system.

Another object of the invention is to increase sales by an efficient method of displaying the stock carried.

Other objects and advantages of the invention will appear as the description proceeds.

The invention resides in the improved store system, and in the combination and arrangement of parts, and of functions thereof, the novelty of which will be particularly pointed out and distinctly claimed hereinafter.

In the accompanying drawings, which constitute part of my disclosure, I have fully and clearly illustrated a preferred embodiment of the invention wherein:

Fig. 5 is an enlarged fragmentary view taken on line 5—5 of Fig. 2.

Fig. 6 is an enlarged vertical section taken on line 6—6 of Fig. 2.

Fig. 7 is an enlarged vertical section taken on line 7—7 of Fig. 2.

In general, my invention comprises the combination, in a retail store, of means for storing merchandise, means facilitating the handling of said merchandise, and means for selling merchandise to customers with a maximum of ease and efficiency. Three separate methods of purchasing goods are available to the customers in my store, any one of which or any combination of which may be used, depending upon the customer's individual preference. Facilities are available for waiting upon customers in the usual manner by clerks, and means are also provided whereby the customers may personally select their purchases from shelves upon which merchandise is displayed in a certain definite classification for ease in locating same. In addition, I provide a new and novel service, wherein the customers select their merchandise while seated in comfortable chairs, by means of a conveyor system which moves the stock past the seated customer.

Upon reference to the accompanying drawings it will be noted that I have illustrated herein, physical means for carrying out the purposes of my invention. Certain modifications are possible and are within the scope of the invention, but the embodiment disclosed herein is preferred because of its many advantageous features, as hereinafter described.

Figure 2:
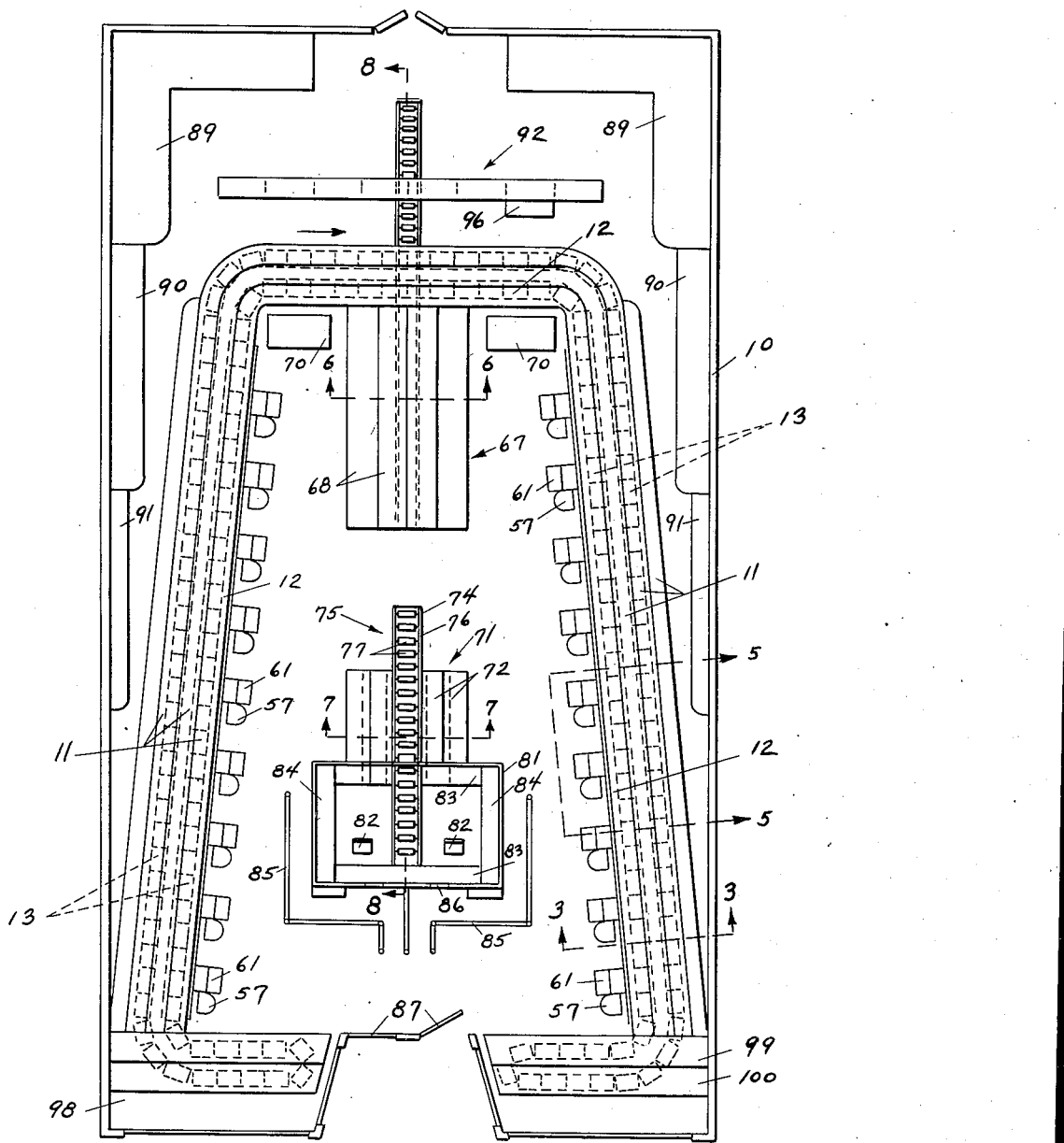
Fig. 2 is a plan view of the floor layout of the store illustrated in Fig. 1.

Fig. 2 diagrammatically illustrates the floor layout of my store, which is housed in a conventional building designated by the reference character 10 and which includes the display shelves 11, the stationary shelves 12 and the movable shelves 13 the latter being shown in dotted lines.

Figure 3:
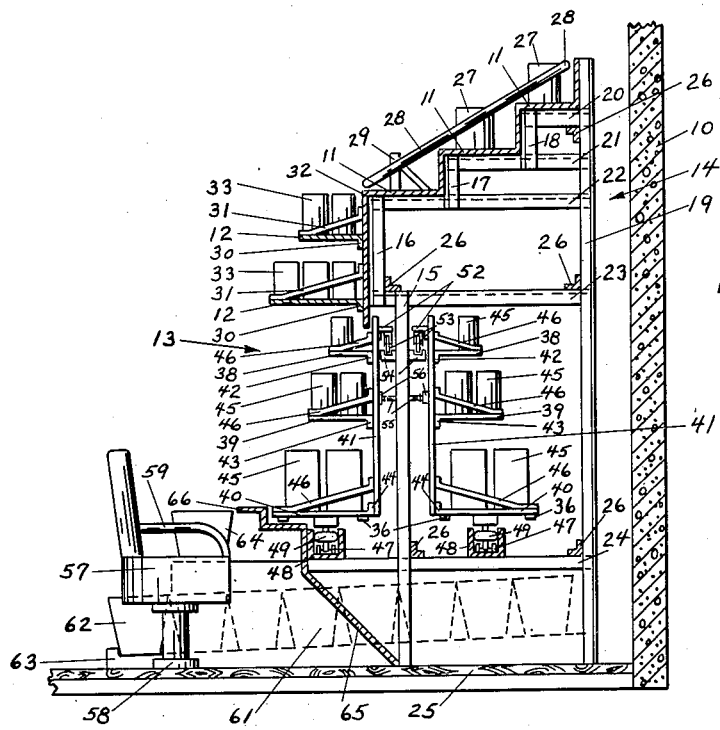
Fig. 3 is an enlarged vertical section taken on line 3—3 of Fig. 2.

The display shelves 11 are positioned along the sides and the rear of the store near the top thereof and serve to effectively advertise a portion of the stock carried. As shown in Fig. 3, the shelves 11 are supported by means of a framework 14 comprising the vertical members 15 to 19 inclusive, and the horizontal members 20 to 24 inclusive. The aforesaid supporting members are preferably L shaped angle bars, but may be of any other suitable construction, and are bolted, riveted, welded or otherwise suitably fastened together. The lower ends of the vertical members 15 and 19 are fixedly secured to the floor 25 of the store 10, and the whole structure is longitudinally braced by means of the members 26, to form a rigid framework.

The display shelves 11 are placed above the customer's reach, and carry sample or empty display packages 27 (Figs. 3 and 5). It is intended to classify the sample containers 27 by brands or by manufacturers and to separate each such classification by neon tubes 28. Different colors may be used in adjacent sections to attractively divide the brands. Upon the lower display shelf is positioned a sign 29 which has the brand name or the manufacturer's name printed thereon. Advertising posters might be used with the above described display, but it is thought that the arrangement proposed herein will serve to attract the customers' attention and will act as an effective advertising medium by associating the various products sold by each manufacturer.

Also fixedly secured to the above described framework 14 are the stationary shelves 12, the latter being positioned below and in front of the display shelves 11, and at a height enabling them to be easily reached by persons standing. The shelves 12 are preferably formed with downwardly disposed flanges 30 at their rearward edges to enable them to be fastened to the framework 14 and are braced by the inclined supporting members 31. A panel 32 is placed at the back of the shelves to shield the framework 14 from view and to act as a retaining wall for the food containers 33 which are placed on said shelves. It is intended to position the merchandise in a definite order and classification on the shelves 12 and to label and number all such merchandise so that it can readily be located. Printed lists or store directories (not shown) may be emplyed to enable the customers to make their selections quickly and accurately. The function of the stationary shelves 12 is to provide a means whereby individual customers may wait upon themselves if they so desire, and also means enabling clerks to wait upon customers who desire such service.

Positioned below the stationary shelves 12 and supported by the framework 14 are the moving shelves which are designated generally by the reference character 13, Figs. 1-5 inclusive. Upon reference to Fig. 4 it will be noted that the moving shelves 13 comprise a plurality of relatively small units 34 which are continuously connected together and arranged to travel in any predetermined route, one such path being shown in Fig. 2. The particular arrangement of the route of the units 34 is dependent upon the size and shape of the building in which it is to be installed, and should be such that a minimum of space is occupied. It is important, however, that the total length of the connected units 34 be sufficient to enable the entire selection of merchandise to be placed thereon, and also so that the movement of the units will be sufficiently slow to permit the customers to make their selections of merchandise therefrom. At the same time it is desirable to have all the merchandise pass each customer in as short a time as possible in consideration of the foregoing requirements.

Figure 4:
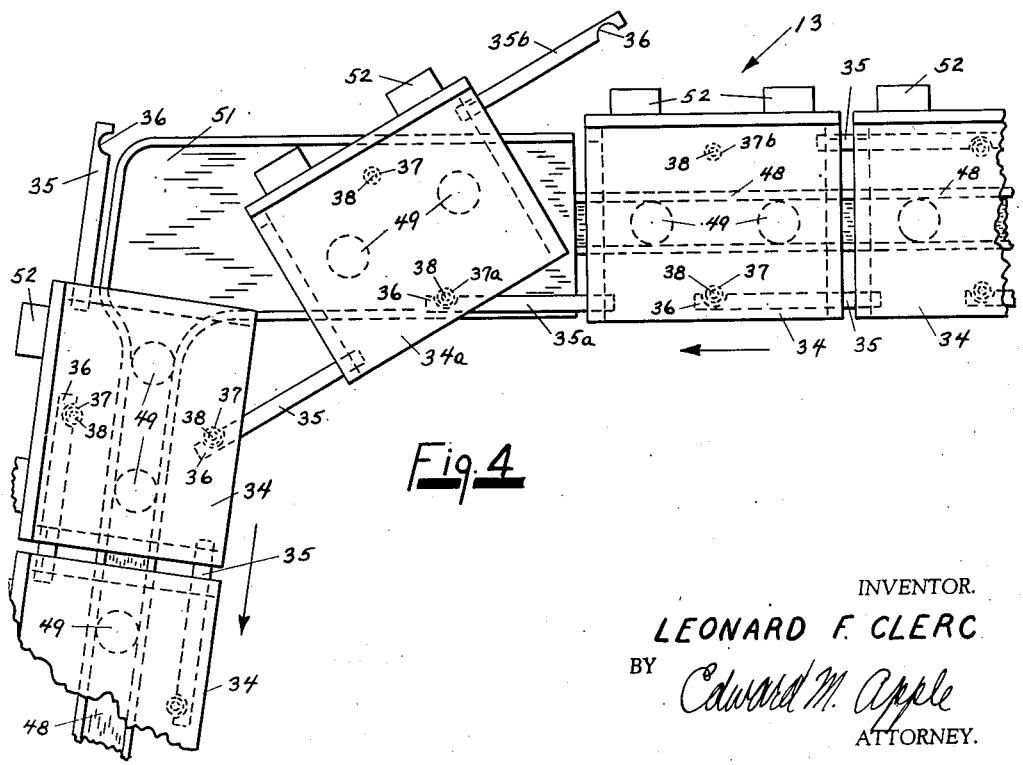
Fig. 4 is an enlarged fragmentary plan view of a portion of the moving conveyors employed in my store, and illustrates the means of guiding the separate units, and the connection means therebetween.

I prefer to connect the units 34 together by flexible yet stable means, as shown in Fig. 4 and hereinafter described. The connection means should be such that the separate units 34 may be placed close together to minimize waste space and also so that the continuous conveyor system may readily turn corners and make sharp U turns. To accomplish this, longitudinally extending arms 35 are rigidly secured to the underneath side of the units 34 at diagonally opposed corners thereof, and are formed with the hook-shaped outer ends 36, the latter being arranged to operatively engage the vertical rollers 37 which are rotatably mounted upon the axles 38 secured to the underneath side of the units 34. The rollers are positioned substantially at the middle of the longitudinal sides of the units 34. The arrangement is such that when the units are traveling in a straight line motion the adjacent cars are held together by the above described arms 35 and the rollers 37. Upon reaching a curve, however, the units 34 partially break apart in a manner substantially as shown by the unit 34a (Fig. 4). The inward side of the units are continually held in connection by the aforementioned engagement of the arm 35a and the roller 37a, but the first turning motion of the unit 34a causes the arm 35b on the opposite or outward side of the unit to swing outwardly, disengaging it from the roller 37b of the following unit. The turning of the unit 34a occurs about the axis of the roller 37a which, being freely rotatable, readily permits such motion. Upon completing the turn the units 34 swing into line in their new direction of travel and the previously disengaged arms 35 and rollers 37 on the outward side of the curve become operatively engaged again. From the above it will be noted that I have devised a simple yet practical method of forming a continuous system of units.

Each unit 34 consists of a plurality of shelves 38, 39, and 40 (Fig. 3), said shelves being positioned one above the other and secured to a back plate 41. The shelves 38 and 39 have downwardly disposed flanges 42 and 43 at the rear edges thereof, for the purpose of fastening them to the back plate 41. The lower shelf 40 has an upwardly disposed flange 44 at its rearward edge so that it will not interfere with the swinging movement of the arms 35 therebelow when the units are going around curves. To enable the shelves to carry the weight of the merchandise 45 placed thereon, supporting braces 46 are positioned at each end of said shelves and suitably secured to the shelves 38, 39 and 40 and the back plate 41. The braces 46 also function to prevent longitudinal displacement of the merchandise 45 upon the shelves. It is also desirable to form a retaining edge around the shelves for the same purpose.

The upper shelf 38 is not as deep as the middle shelf 39, and likewise the shelf 39 is shallower than the lower shelf 40, permitting the customers to easily reach any article on any of the shelves. To accommodate articles of various heights and to efficiently utilize the shelf space upon the units 34, I prefer to make the two upper shelves 38 and 39 adjustable, by any suitable means (not shown).

The units 34 are supported upon the vertically disposed wheels 47 (Fig. 3) which are arranged to travel in the U shaped channel members 48, the latter being fixedly secured to the horizontal members 24 of the framework 14. The wheels 47 are freely rotatable upon their respective axles. To prevent lateral displacement of the units 34 from their predetermined path of travel, I provide the horizontally disposed wheels 49 which are rotatably mounted upon vertical axles depending from the underneath side of said units, and which are arranged to travel in the aforementioned channel members 48 and to ride against the vertical bearing surfaces formed by the upwardly disposed flanges of said members 48. The wheels 47 and 49 are positioned substantially along the longitudinal centerlines of the units 34 near each end thereof, to form stable supports and guides for the units. As shown in Fig. 4, the channel members 48 are considerably widened at the curves, as at 51, to enable the units to swing about into their new line of travel, as hereinabove described.

In order to stabilize the upper portion of the units 34, and to prevent lateral displacement thereof, I provide brackets 52 (Fig. 3) mounted upon the rear portion of the units, and vertically disposed wheels 53 rotatably mounted thereunder, said wheels being arranged to travel in the grooves formed in the U shaped channel members 54, the latter being secured to the upright members 15 by bolting, riveting, welding or any other suitable means.

Power to actuate the continuous system of units 34 may be derived from any suitable source (not shown) and motivates the sprocket chain 55 (Fig. 3) which is suitably mounted upon the framework 14, and particularly upon the vertical members 15. The chain is adapted to engage projections 56 secured to the back of the panels 41 to move them at the proper speed. It is advisable to arrange the chain so that it engages the units only on the straight-a-ways, so that they may be free to be carried around curves by connection between the units, as hereinabove described.

At spaced intervals along the conveyor system are positioned the chairs 57 (Fig. 2) which enable the customers to be comfortably seated while making their purchases from the moving shelves. The chairs are rotatably mounted upon bases 58 to facilitate seating the customers, said bases being fixedly secured to the floor to keep them in place. If desired a spring return arrangement (not shown) may be employed to keep the chairs 57 in orderly alignment when not in use. Arms 59 are provided on the chairs and a parcel compartment 60 (Fig. 5) is formed underneath the seat for the customer's convenience.

Adjacent the chairs 57 are placed basket racks 61 (Figs. 2, 3 and 5) which contain baskets 62 for the customer's use. The rack is inclined, as shown in Fig. 3 so that a plurality of empty baskets placed therein will automatically slide by gravity into a position where they can be readily reached from the customer's chair 57. A stop 63 is positioned at the lower end of the rack to hold the baskets in place. The particular basket in use by the seated customer is placed upon the top of the rack as indicated by the numeral 64 in Figs. 3 and 5. Each basket is provided with a duplicate set of numbered tags, one of which always remains on the basket, the other being retained by the customer to identify his or her purchase at the delivery section hereinafter described. Sufficient space is allowed between adjacent chairs 57 and basket racks 61 to permit persons standing to reach the stationary shelves 12 without interfering with the people seated.

Extending upwardly from the floor 25 of the store 10 is a panel 65 (Fig. 3) which is secured to the floor and to the members 24 and 48. The panel is so arranged that sufficient room is provided underneath the shelf 40 for the customer's legs and feet. The top of the panel 65 has a horizontal extension portion 66 which serves as an arm rest for the persons seated and which also extends a slight distance above the level of the lower shelf 40 for the safety of the customers. I propose to associate with the member 66, a buzzer system or other means of communication with the delivery section 81, so that the customer will be able to communicate with the delivery section when he or she desires to leave his or her position in front of the moving conveyor.

Figure 8:
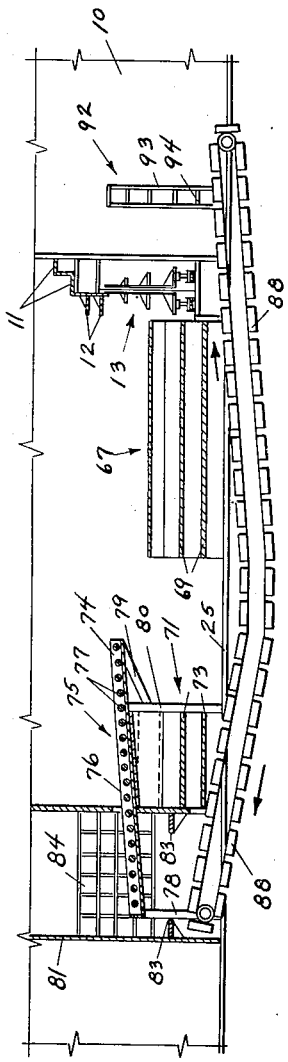
Fig. 8 is a longitudinal, vertical section taken on line 8—8 of Fig. 2.

Perishable commodities such as fruits and vegetables are arranged upon the rack designated generally by the numeral 67 in Figs. 2, 6 and 8. I prefer to centrally locate the rack 67 so that it will be convenient for the customers to use, who may either wait upon themselves or secure the assistance of clerks if they so desire. The rack 67 is formed with the inclined tiers 68 on its upper surface and is also provided with the shelves 69 upon which the commodities are placed.

Located near the rack 67 are the meat containers 70, within which packaged meats of all kinds are stored. Dry ice is preferably used to keep the meats cold and suitable doors enable the customer to make his own selections.

I also provide an additional rack 71 (Figs. 2, 7 and 8) which may be used for baked goods and the like. The rack 71 has a top 72 arranged in tiers and a number of shelves 73 arranged to accommodate the baked goods.

When the customers have finished shopping by means of the hereinabove described methods, their baskets, which are now filled with their purchases, are carried by attendants to the central portion of the store and placed upon the upper end 74 of the inclined runway 75 (Figs. 2 and 8). The runway 75 is formed with retaining edges 76 to prevent the baskets from falling off the sides thereof, and is equipped with a plurality of rollers 77, the latter being rotatably mounted therein. The runway is positioned on top of the rack 71 and extends beyond either end of said rack, being supported and braced by the supporting members 78, 79 and 80 (Fig. 8).

The runway 71 extends downwardly from the high end 74 into a small partitioned room or booth 81, within which a clerk or cashier places the contents of each basket into paper bags and totals the value of each customer's purchases. To accomplish this the booth is provided with chairs 82 and shelves 83 and is also equipped with a plurality of divided shelves 84 wherein the bags are placed pending the arrival of the customers to claim them. This permits the checking of purchases should the customer desire to do additional shopping elsewhere before returning home. Partially around the outside of the booth 81 is positioned a railing 85 (Fig. 2) which enables the customers to pass in front of the booth where they pay the cashier and receive their purchases through the window 86. The railings 85 then lead directly to the doors 87 of the store 10.

Should the customers desire to have their purchases delivered to them at their home, the clerk in the booth 81 places the bags containing the merchandise upon the conveyor 88 (Fig. 8) which carries them to the rear of the store for loading onto a truck. The conveyor 88 may be of any suitable type and is dipped as shown in Fig. 8 to enable it to pass below the floor 25 so that it will not prevent customers from walking across the store. The operator at the rear of the store should operate the conveyor to enable him to reach the bags when he is ready for them.

Figure 9:
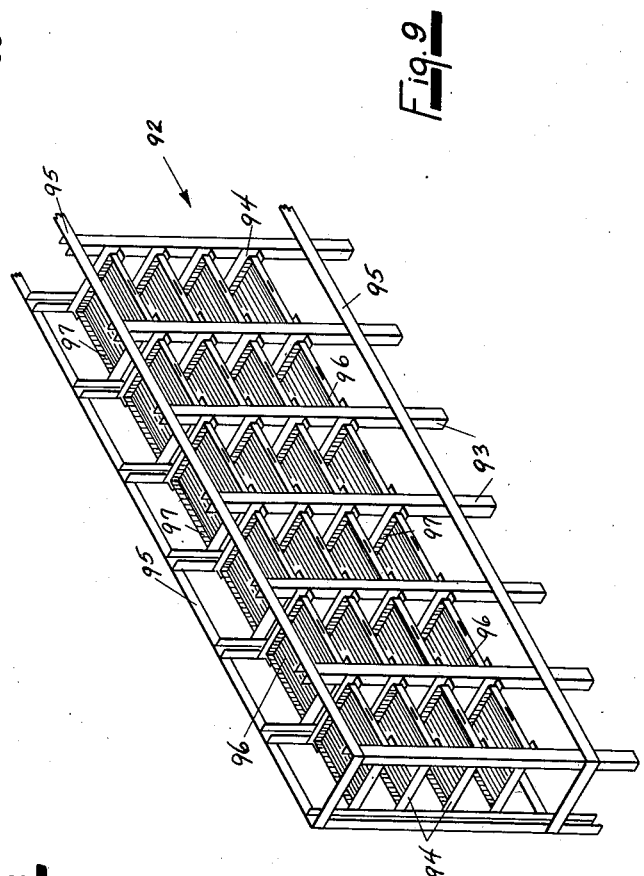
Fig. 9 is an enlarged perspective view of a portion of the racks employed in the storage section of the store from which merchandise is transferred to the conveyor system.

The rear portion of the store is partitioned from the sales department and serves as a storage section for surplus stock, which is stored upon the shelves 89, 90 and 91. In addition, means are provided for loading the moving shelves 13 when the stock of merchandise thereon becomes depleted because of sales. Said means comprises a loading rack 92 (Figs. 2, 8 and 9). The rack 92 consists of an open supporting framework which is made up of the upright U shaped channel members 93, the transverse L shaped track members 94, and the longitudinal braces 95. The above mentioned members are secured together by welding, riveting, bolting or any other suitable means. Arranged to slide upon the track members 94 are the trays 96 which are formed with upwardly extending retaining edges 97. The trays 96 are extendible at either side of the rack and are filled with stock at the rear side thereof and then pushed into the rack. To load the moving shelves 13 the operator stands between the rack 92 and the moving shelves, pulls out the trays 96 upon which the merchandise to be transferred has previously been placed, and transfers the commodities to the shelves 13 as they pass by. To enable the loading to be done efficiently the trays 96 are loaded in such a manner that the operator can work continuously from one end of the rack to the other end while loading, thus eliminating time lost by unnecessary moving about while loading.

Figure 1:
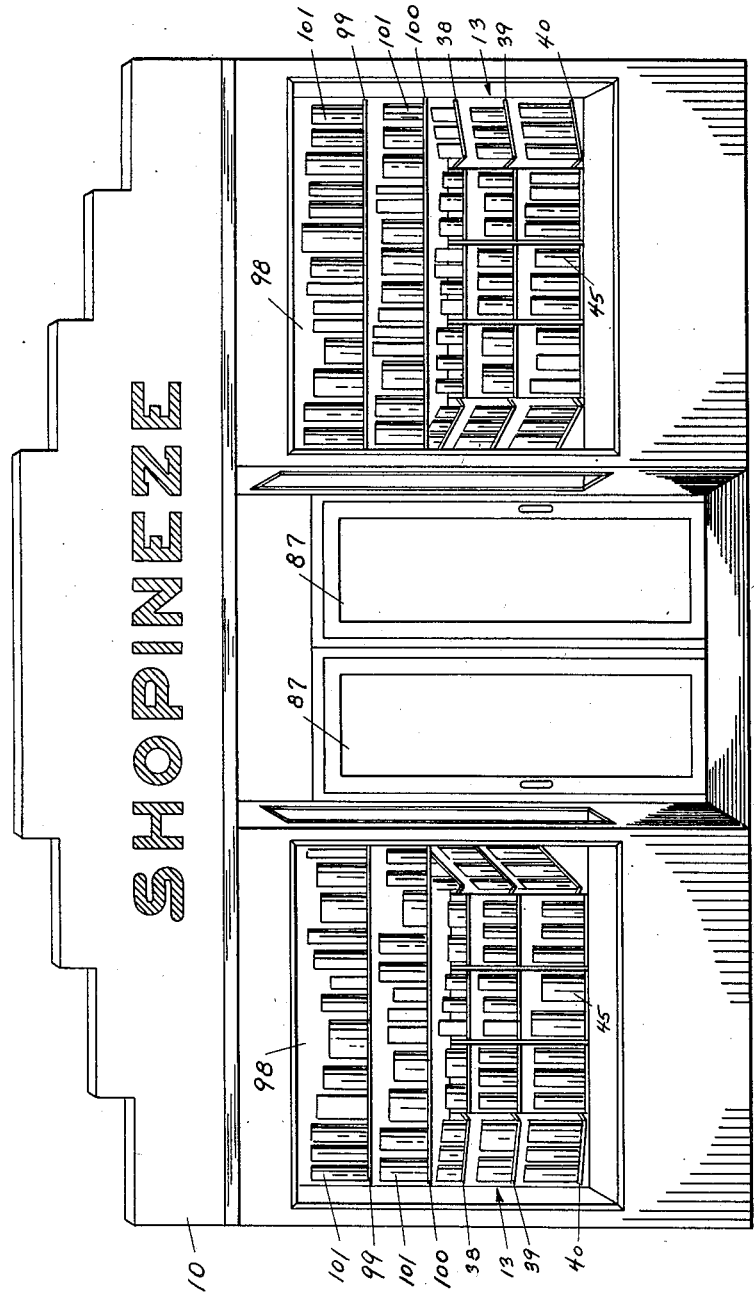
Fig. 1 is a front elevation of a store constructed in accordance with my invention.

For the purpose of display, I prefer to arrange the window space 98 of my store as shown in Fig. 1. The two shelves 99 and 100 are stationary and display typical merchandise 101 thereupon, while the space below them is occupied by the moving shelves 13, which are arranged as shown in Fig. 2 to pass through the front of the store where they can be viewed through the windows. This feature forms an attractive window display since it is constantly changing and since it enables outsiders to see the entire stock move through the window space 98.

From the foregoing description it will be readily seen that I have devised a novel store comprising many advantages. The particular arrangement of parts of the store illustrated in the accompanying drawings may be varied considerably without departing from my fundamental system.

Although I have herein disclosed a certain embodiment of the invention, it will be understood that various modifications may be employed, without violating the spirit of the invention, all of which are intended to be within the scope of the appended claims.

Having described my invention, what I claim and desire to secure by Letters Patent is:

1. A display arrangement for a store or the like, comprising the combination of a framework consisting of a plurality of upright and cross members, shelves on top of said framework, means on said framework for supporting an endless conveyor below said shelves, an endless conveyor arranged to travel on said last named means, shelves on said conveyor, and an angularly disposed skirt member supported by said framework terminating in a counter piece.

2. A display arrangement for a store or the like comprising the combination of a framework arranged in a U shaped manner within the store, the open portion of said U facing the front of said store, said framework consisting of a plurality of upright and cross members, shelves on top of said framework, means on said framework for supporting an endless conveyor below said shelves, an endless conveyor arranged to travel on said last named means, shelves on said conveyor, and an angularly disposed skirt member supported by said framework terminating in a counter-piece.

3. A display arrangement for a store, comprising the combination of a U shaped framework, the base of said U being positioned adjacent the rear of said store, said framework consisting of a plurality of upright and cross members, shelves on the top of said framework, means on the front upright members of said framework for supporting and guiding an endless conveyor arranged to travel below said shelves in front of and behind said front upright members, an angularly disposed skirt member supported by said framework terminating in a counter-piece, and inclined chutes supported by said framework below said counter, said chutes extending beyond the front edge of said counter.

LEONARD F. CLERC.